United States Patent
Zhang et al.

(10) Patent No.: US 11,289,865 B2
(45) Date of Patent: Mar. 29, 2022

(54) HIGH FREQUENCY SLIP RING WITH THROUGH BORE

(71) Applicant: Princetel, Inc., Hamilton, NJ (US)

(72) Inventors: Hong Zhang, Singapore (SG); Joe Ritacco, Hamilton, NJ (US); Boying B Zhang, Hamilton, NJ (US); Jingrong Shen, P.R. China (CN)

(73) Assignee: PRINCETEL, INC., Hamilton, NJ (US)

( * ) Notice: Subject to any disclaimer, the term of this patent is extended or adjusted under 35 U.S.C. 154(b) by 245 days.

(21) Appl. No.: 16/790,728

(22) Filed: Feb. 13, 2020

(65) Prior Publication Data

US 2021/0057861 A1    Feb. 25, 2021

Related U.S. Application Data

(63) Continuation-in-part of application No. 16/548,743, filed on Aug. 22, 2019.

(51) Int. Cl.
| | |
|---|---|
| *H01R 39/08* | (2006.01) |
| *H01R 39/18* | (2006.01) |
| *H01R 39/14* | (2006.01) |
| *H01R 39/38* | (2006.01) |
| *G02B 6/36* | (2006.01) |
| *H01R 39/34* | (2006.01) |

(52) U.S. Cl.
CPC .............. *H01R 39/08* (2013.01); *G02B 6/36* (2013.01); *G02B 6/3604* (2013.01); *H01R 39/14* (2013.01); *H01R 39/18* (2013.01); *H01R 39/383* (2013.01); *H01R 39/34* (2013.01)

(58) Field of Classification Search
CPC ........ H01R 39/08; H01R 39/14; H01R 39/18; H01R 39/383; H01R 39/34; G02B 6/36; G02B 6/3604
USPC ........................................... 310/232
See application file for complete search history.

(56) References Cited

U.S. PATENT DOCUMENTS

| | | | |
|---|---|---|---|
| 4,687,899 A | 8/1987 | Acheson | |
| 6,907,161 B2 | 6/2005 | Bowman | |
| 6,980,714 B2 | 12/2005 | Lo | |
| 8,121,448 B2 | 2/2012 | Wetzel | |
| 8,611,753 B2 | 12/2013 | Lo | |
| 9,263,838 B1 * | 2/2016 | Zhang | H01R 13/6473 |
| 10,133,006 B1 * | 11/2018 | Zhang | H01R 39/643 |
| 10,236,741 B2 | 3/2019 | Sørensen | |
| 11,056,849 B2 * | 7/2021 | Sixt | H01R 39/58 |

(Continued)

*Primary Examiner* — Ahmed Elnakib
(74) *Attorney, Agent, or Firm* — Klein, O'Neill & Singh, LLP

(57) ABSTRACT

The current disclosure is regarding an electrical slip ring assembly that transmit signals, data, and power across rotary platforms, especially for high frequency applications. The high frequency slip ring assembly with through bore may include a first stage slip ring, a second stage slip ring, a gear assembly, and an internal cable assembly. Rings may have an angled notch on a circumference to break said rings and have the same diameter. The first stage slip ring and second stage slip ring may be connected in series sequence, i.e., the stator in first stage slip ring is mechanically connected with the rotor in second stage slip ring. The internal cable assembly electrically connects the brush assembly in first stage slip ring with the ring assembly in said second stage slip ring in each channel respectively.

12 Claims, 10 Drawing Sheets

(56) References Cited

U.S. PATENT DOCUMENTS

| | | | |
|---|---|---|---|
| 2012/0020615 A1* | 1/2012 | Zhang | G02B 6/3604 |
| | | | 385/26 |
| 2012/0043580 A1* | 2/2012 | Yamazaki | H01L 29/78621 |
| | | | 257/99 |
| 2021/0057860 A1* | 2/2021 | Zhang | G02B 6/36 |
| 2021/0057861 A1* | 2/2021 | Zhang | G02B 6/3604 |
| 2021/0215883 A1* | 7/2021 | Zhang | H01P 3/16 |

* cited by examiner

HIGH FREQUENCY SLIP RING WITH THROUGH BORE

CROSS REFERENCE TO RELATED APPLICATION

This application is a continuation of U.S. patent application Ser. No. 16/548,743, filed Aug. 22, 2019, which is incorporated by reference herein in its entirety.

BACKGROUND

The present disclosure relates generally to an electrical slip ring assembly that transmit signals, data, and power across rotary platforms, more particularly for high frequency applications.

A conventional electrical slip ring consists of rotor, stator, conductive rings and brushes. There are cables terminated, (soldered) to said rings and said brushes respectively. Said rings are mounted on slip ring rotor and insulated from it. Said brushes are usually fixed on slip ring stator and run in contact with said rings, rubbing against the peripheral surfaces of the rings, so that electrical power or signals can be transmitted from the cables on rings to the cables on brushes, or vice versa.

Supposing there is only one brush for each ring, when ring turns with said rotor, in both clockwise and counterclockwise directions, the terminating spot of the cable on ring and the contact spot between brush and ring will divide the ring circle into two segments as shown in FIG. 1 and FIG. 2. It produces two parallel paths from the brush to the ring terminal that are of unequal and varying length. The ring-brush transmission will become a parallel circuit electrically as shown in FIG. 2 and this feature creates phase mismatching that can be significant on large diameter rings. Assuming the ring diameter is D, so the circumference of the ring is $\pi D$. If the central angle of terminating spot relative to said contact spot is $\theta$, then the arc length 1 should be $\theta D/2$, if $\theta$ is measured in radians, and Arc length 2+Arc length 1=$\pi D$. In FIG. 2, R1 and R2 are the equivalent resistances of Arc length 1 and Arc length 2 respectively from FIG. 1. Because the Arc lengths of said segments are periodically changed, the maximum difference between Arc length 1 and Arc length 2, i.e. max path difference, would be $\pi D/2$ and the minimum is 0. Slip rings do a great job of transmitting electrical power. For low frequency signals this path difference is negligible, for high frequencies it is not. These path distance change and the path difference changes will result in varying signal distortion, like phase change, as the slip ring is rotated. For high frequency signals, the ring diameter (and hence the path lengths) must be kept as small as possible. The higher, the frequency is, the smaller the ring diameter.

Analog signals that are carried by slip rings vary in frequency from DC (Direct current) to ~500 MHz. Digital signals vary from DC to 1.5 Gbps (gigabit per second). For examples, frequency for gigabit ethernet is about 250 Mhz, while for HD-SDI (high-definition serial digital interface) it is as high as 742.5 MHz. For most applications, like radar, a big through bore is required for the slip ring, because the slip ring needs to be combined with RF rotary joints, fiber optic rotary joints, fluid rotary joints, and encoders. There is a need to provide an ethernet slip ring of 1000BaseT with through bore ID (inner diameter) bigger than 1.5", and to address other limitations of conventional slip rings.

SUMMARY

In some embodiment an objective in the current disclosure is to provide a slip ring with through bore for high frequency applications. The slip ring may have the special capability, or function, to eliminate the parallel path issue (phase mismatching issue) and also keep the distances, or path lengths, between ring terminal to brush unchanged. The slip ring assembly may be engaged with said gear assembly in the first stage slip ring, wherein the gear teeth numbers of said gears are specified to enable the stator in the first stage slip ring and the rotor in second stage slip ring to rotate at the half speed of the rotor in first stage slip ring. The stator in second stage slip ring may be fixed with ground.

DETAILED DESCRIPTION

A detailed explanation of the various embodiments in the present disclosure is as follows. Reference numbers are used throughout the drawings to refer to the same elements in different drawings. A reference X axis and Y axis are shown in various drawings for orientation.

Figure 3:
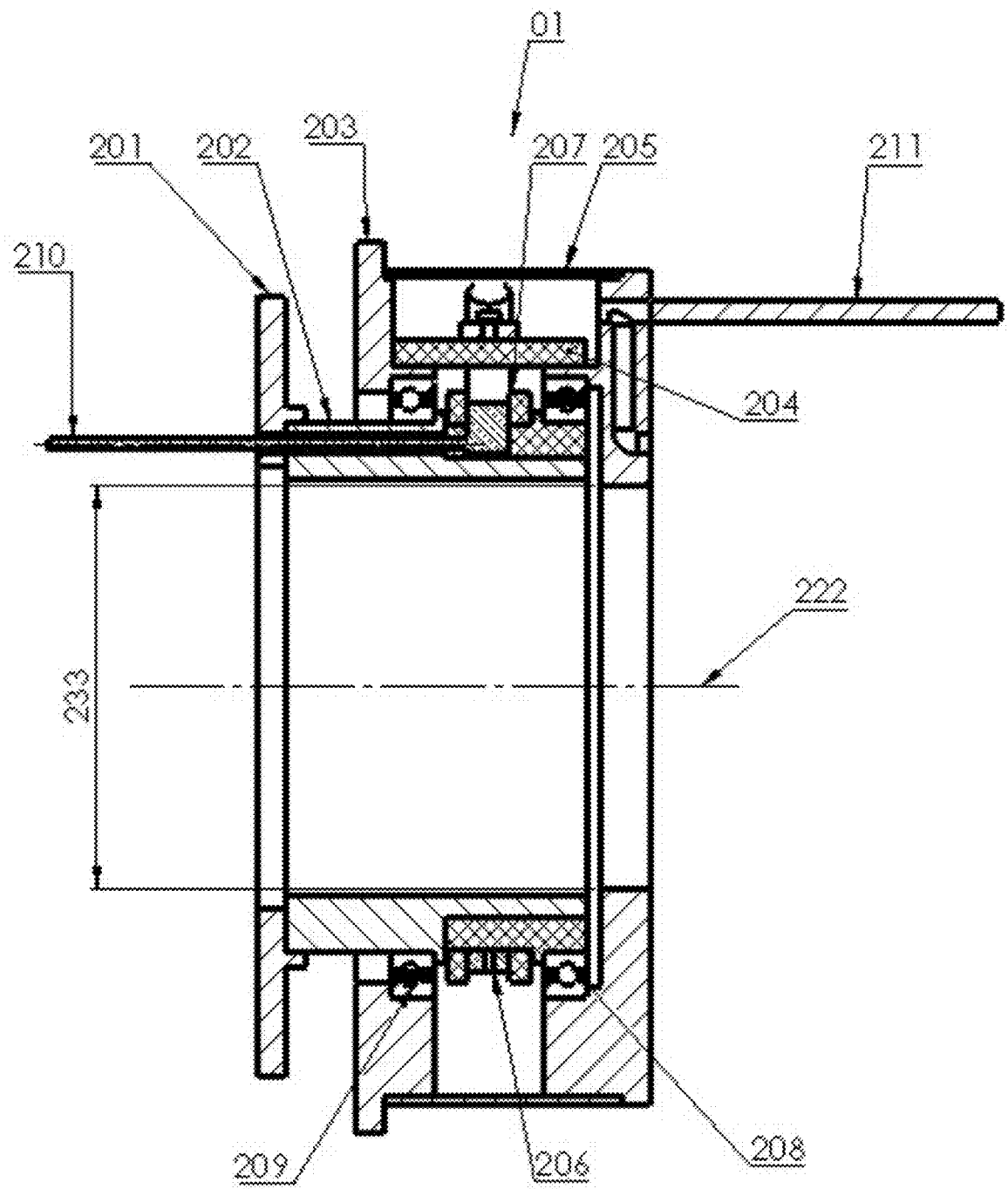
FIG. 3, FIG. 4 show a configuration of a single stage slip ring assembly in the current disclosure.
Figure 4:
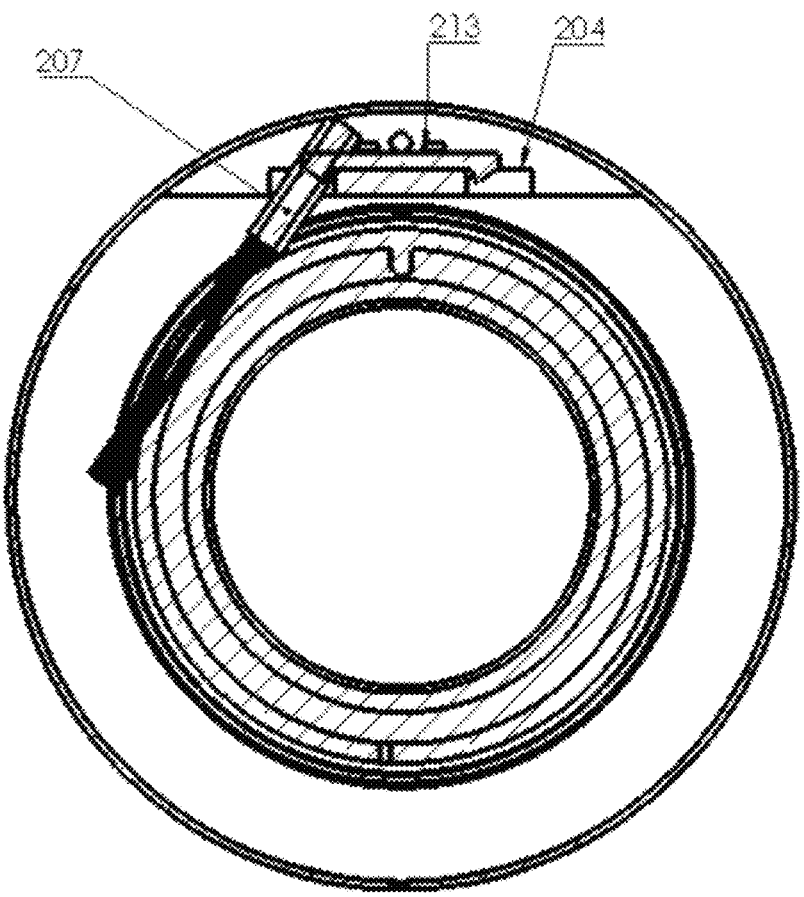

FIG. 3, and FIG. 4 shows a configuration of a single stage slip ring assembly 01 in the present disclosure. Said slip ring assembly 01 consists of rotor 202 and stator 205. They are relatively rotational through ball bearings 208 and 209 around the axis 222. Said slip ring assembly 01 has a through bore 233. The ring 206 is mounted on said rotor 202. The quantity of rings can be any number (FIG. 3 only shows one ring for illustration purpose). A brush 207 is mounted on brush block 204 through bussbar 213. Said ring 206, brush 207, and bussbar 213 are made of conductive materials. Said brush block 204 is fixed on said stator 205. Cable 210 and 211 are soldered on said ring 206 and said brush 207 respectively. Said brush 207 is in contact on the outer surface of said ring 206 to transmit electrical signals, and power to said cable 211 from cable 210, or from cable 211 to cable 210 bi-directionally. Said stator 205 has a driven gear 203. Said rotor 202 has a driving gear 201.

Figure 5:
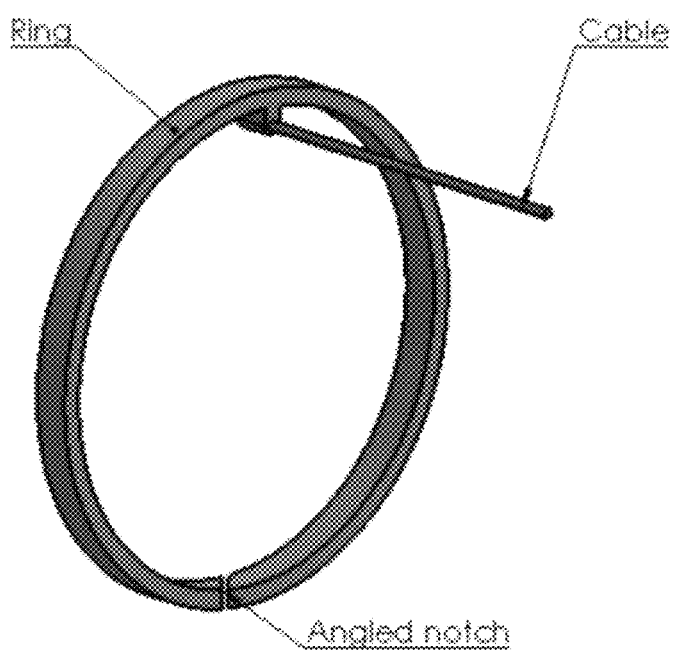
FIG. 5 shows a ring configuration with an angled notch and a cable soldered on it in the present disclosure.

FIG. 5 shows a ring configuration with an angled notch and a cable soldered on it in the present disclosure. The terminating spot of said cable and said notch are separated 180° apart, around the circumference of said ring. In other words, assuming the ring diameter is D, the distance between said terminating spot and said notch is about $\pi D/2$.

Figure 6:
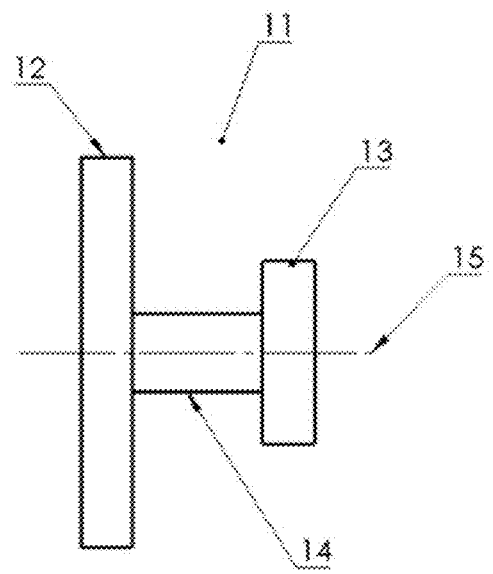
FIG. 6 shows a dual-gear assembly.

FIG. 6 shows a dual-gear assembly 11 (it can be any gear assembly). Said dual-gear assembly 11 consists of input gear 12, output gear 13, and shaft 14. Said input gear 12 and output gear 13 are fixed on said shaft 14. Said input gear 12, output gear 13, and shaft 14 are rotational around axis 15.

Figure 7:
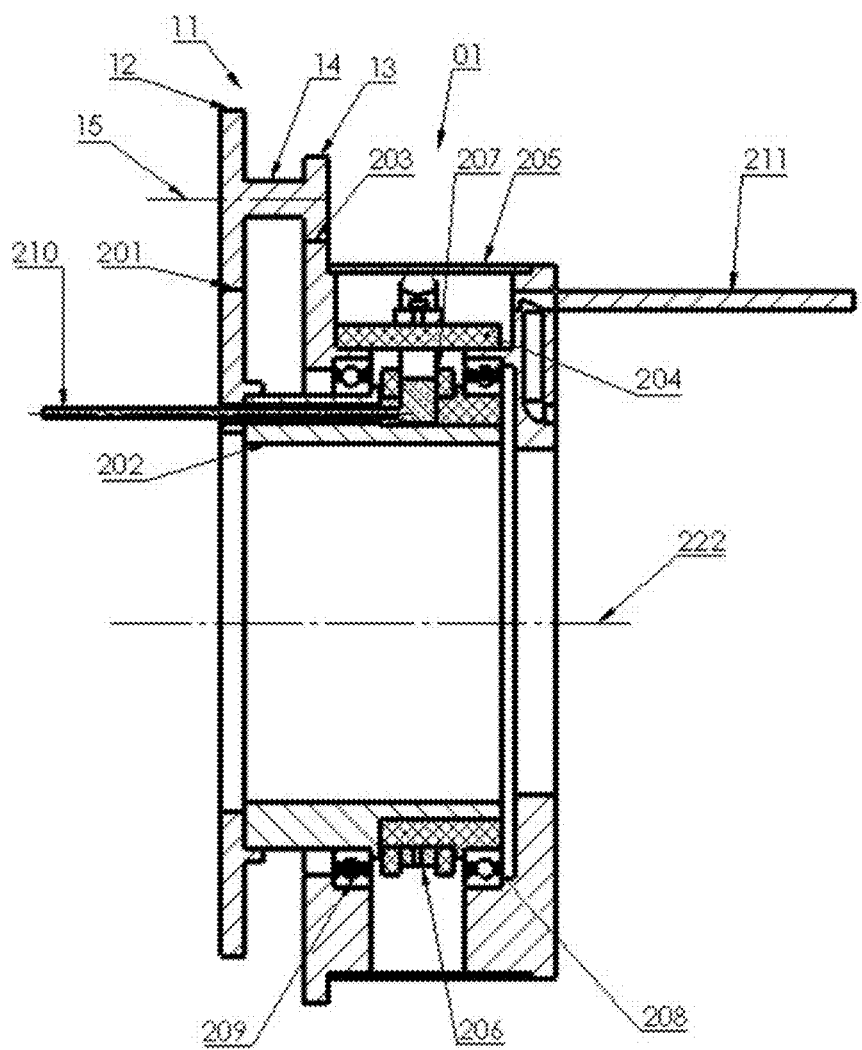
FIG. 7 shows a single stage slip ring coupled with said dual-gear assembly in the present disclosure.

FIG. 7 shows a single stage slip ring coupled with said dual-gear assembly in the present disclosure. Said slip ring assembly 01 is coupled with said dual-gear assembly 11. Said input gear 12 is engaged with said driving gear 201 on rotor, and said output gear 13 is engaged with said driven gear 203 on stator. For a conventional slip ring, usually the stator 205 is stationary. The rotor 202 is rotational. But if a dual-gear assembly 11 is coupled with said slip ring assembly 01 as shown in FIG. 7, when driving gear 201 and rotor 202 rotates at speed N1 rpm (rotations per minute), said stator 205 will become rotational at speed N2 rpm. The speed ratio, N2/N1, is dependent on the gear ratio of said driving gear 201, input gear 12, output gear 13, and driven gear 203. In the present disclosure, N2/N1=½.

Figure 8:
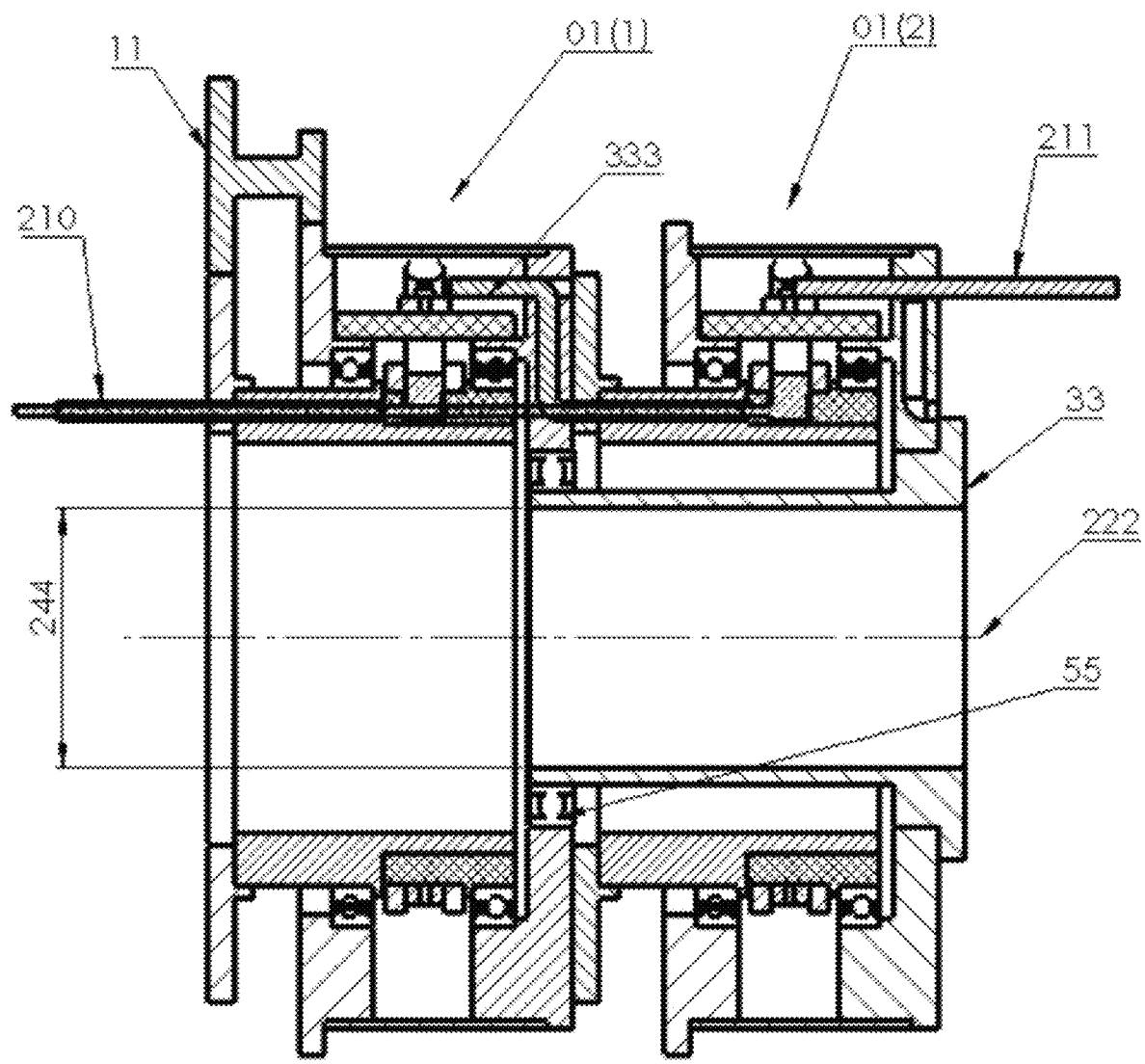
FIG. 8 shows an embodiment in the present disclosure for high frequency applications. It consists of two single stage slip rings in FIG. 7.

FIG. 8 is shows two slip rings coupled together, which are useful for high frequency applications. It consists of two stage slip ring assemblies 01(1), 01(2) and one dual-gear assemblies 11. The gear 201 and gear 203 would not be used in slip ring 01(2). Both slip ring assemblies 01(1) and 01(2) have the ring configuration as shown in FIG. 5. Said slip ring 01(1) is connected with slip ring 01(2) in series sequence. In other words, the stator of slip rings 01(1) is mechanically connected with the rotor of slip ring 01(2). The cable 333 electrically connects the brush on slip ring 01(1) to the ring on slip ring 01(2). The length of cable 333 is completely defined, which means that length of cable 333 is a constant. So the stator on slip rings 01(1) is rotatable but the stator on slip ring 01(2) is stationary. The part 33 is fixed with the stator on slip ring 01(2) and supports the ball bearings 55 to enable the stator on slip ring 01(1) to rotate. The preferred embodiment in the present disclosure has a through bore 244.

If the gear ratio of said dual-gear 11 is λ=2:1, the rotor on slip ring 01(1) rotates at speed Nr1, the stator on slip ring 01(1) rotates at speed Ns1, and the rotor on slip ring 01(2) rotates at speed Nr2, and the stator on slip ring 01(2) is grounded at speed Ns2, then, the speed relations can be represented by the following equations:

$$Ns1=Nr1/\lambda=Nr1/2;$$

$$Nr2=Ns1=Nr1/2;$$

$$Ns2=0$$

That means the stator on the first stage and the rotor on the second stage will rotate together, at the half speed of the rotor on the first stage in the current disclosure.

Figure 9:
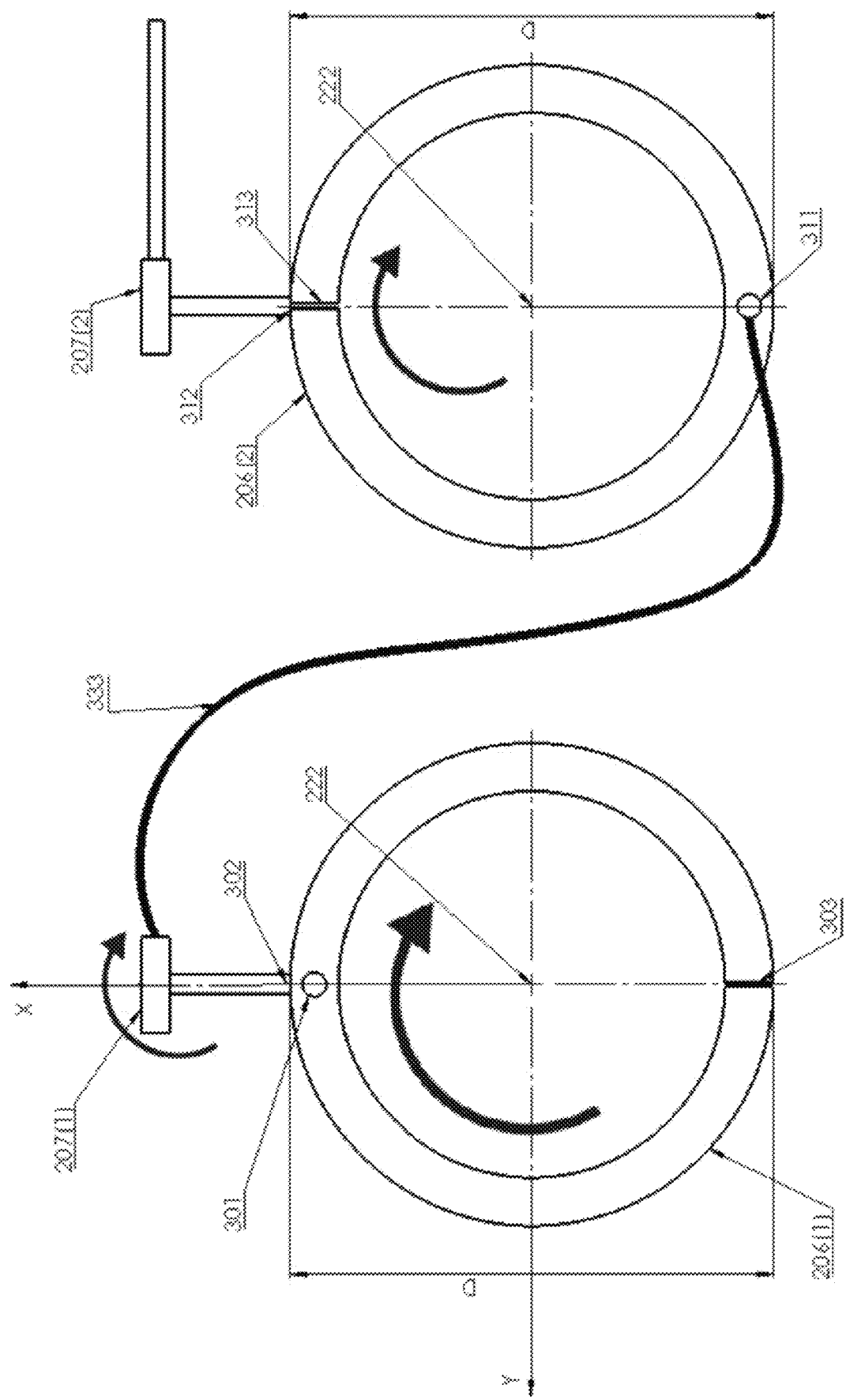
FIG. 9 illustrates the start position, or home position of rings and brushes in FIG. 8.

FIG. 9 illustrates the start position, or home position of said rings and brushes in FIG. 8. For illustration purpose, the ring-brush engagements for the slip ring 01(1) and slip ring 01(2) are shown in the same plane as in FIG. 9. The ring 206(1) and brush 207(1) are from the first stage slip ring 01(1) in FIG. 8. The ring 206(2) and brush 207(2) are from the second stage slip ring 01(2) in FIG. 8. The contact spots between said rings and said brushes are represented as 302 and 312 in slip ring 01(1) and 01(2) respectively. The terminating spots of cables on said rings are represented as 301 and 311 in slip ring 01(1) and 01(2) respectively. Cable 333 is used to connect brush 207(1) in the first stage slip ring 01(1) to ring 206(2) in the second stage slip ring 01(2). Said ring 206(1) and ring 206(2) may have the same ring diameter D, and the same notch as shown in FIG. 5. Said notches are represented as 303 and 313 in slip ring 01(1) and 01(2) respectively. The slip ring 206(1) and 206(2) rotate around the same axis 222 at the same direction. Based on above analysis, brush 207(1) and ring 206(2) rotate at the half speed of ring 206(1).

Figure 1:
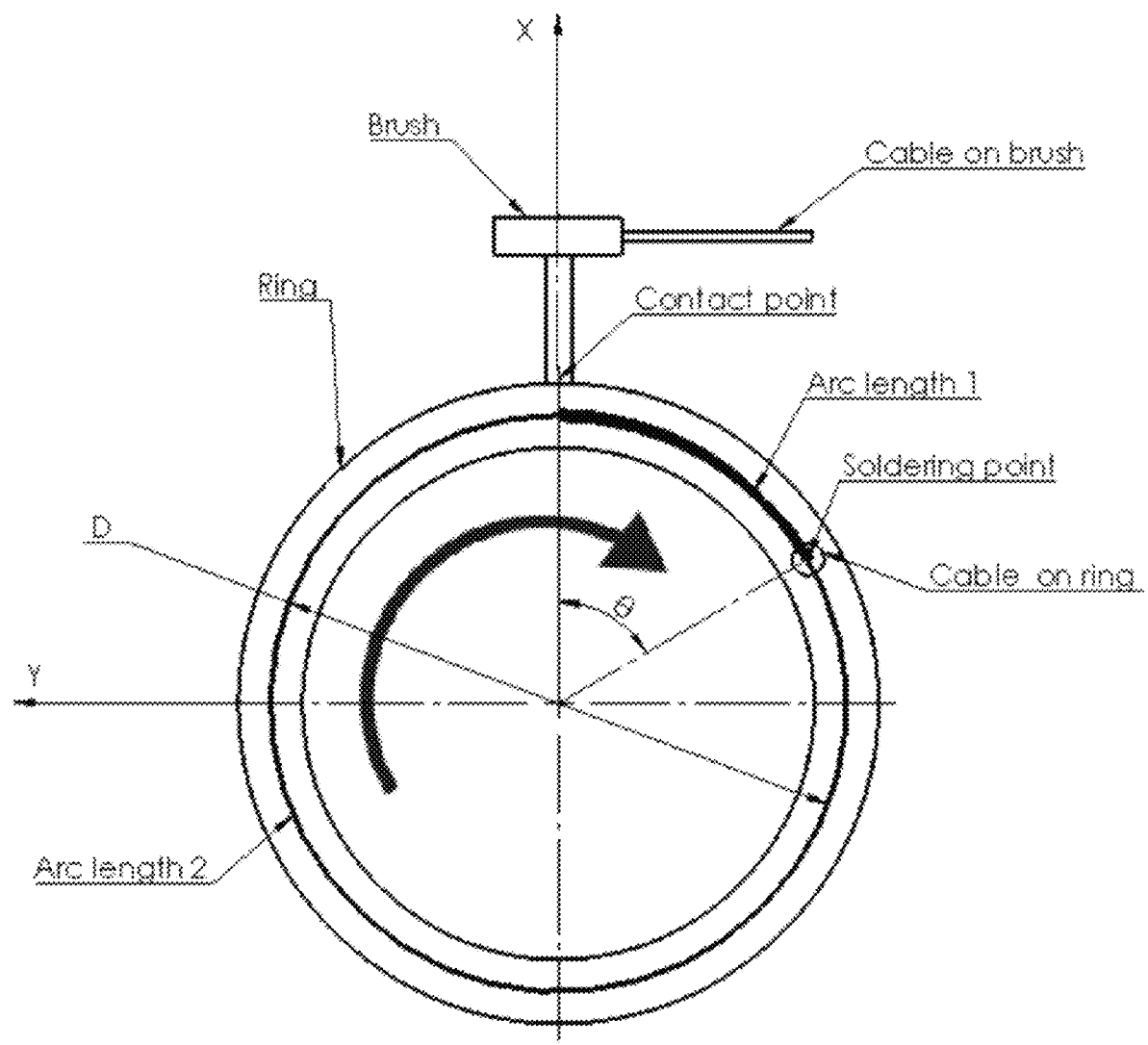
FIG. 1 shows the conventional ring-brush contact model.

Referring to FIG. 1, the distance from terminating spot of cable on ring to the contact spot of brush and ring is the arc length between said terminating spot and said contact spot. From FIG. 1, said arc length is proportional to the central angle of terminating spot relative to said contact spot 0. Back to FIG. 9, because the ring 206(1) and 206(2) have the same diameter D, the arc length, or the distance from terminating spot to the contact spot, can be represented by the central angle θ. Some embodiments include two-stage slip ring. The distance 1, or arc length 1 can be represented by 01 for slip ring 01(1) and the distance 2, or arc length 2 can be represented by or 02 for slip ring 01(2). Arc length 1, AL1 is assigned to the distance 1, or arc length 1; Arc length 2, AL2 is assigned to the distance 2, or arc length 2. So the start position, or home position of said rings and brushes in slip ring 01(1) and 01(2) are defined as follows:

$$\theta 1=0°,$$

$$\theta 2=180°.$$

Figure 10:
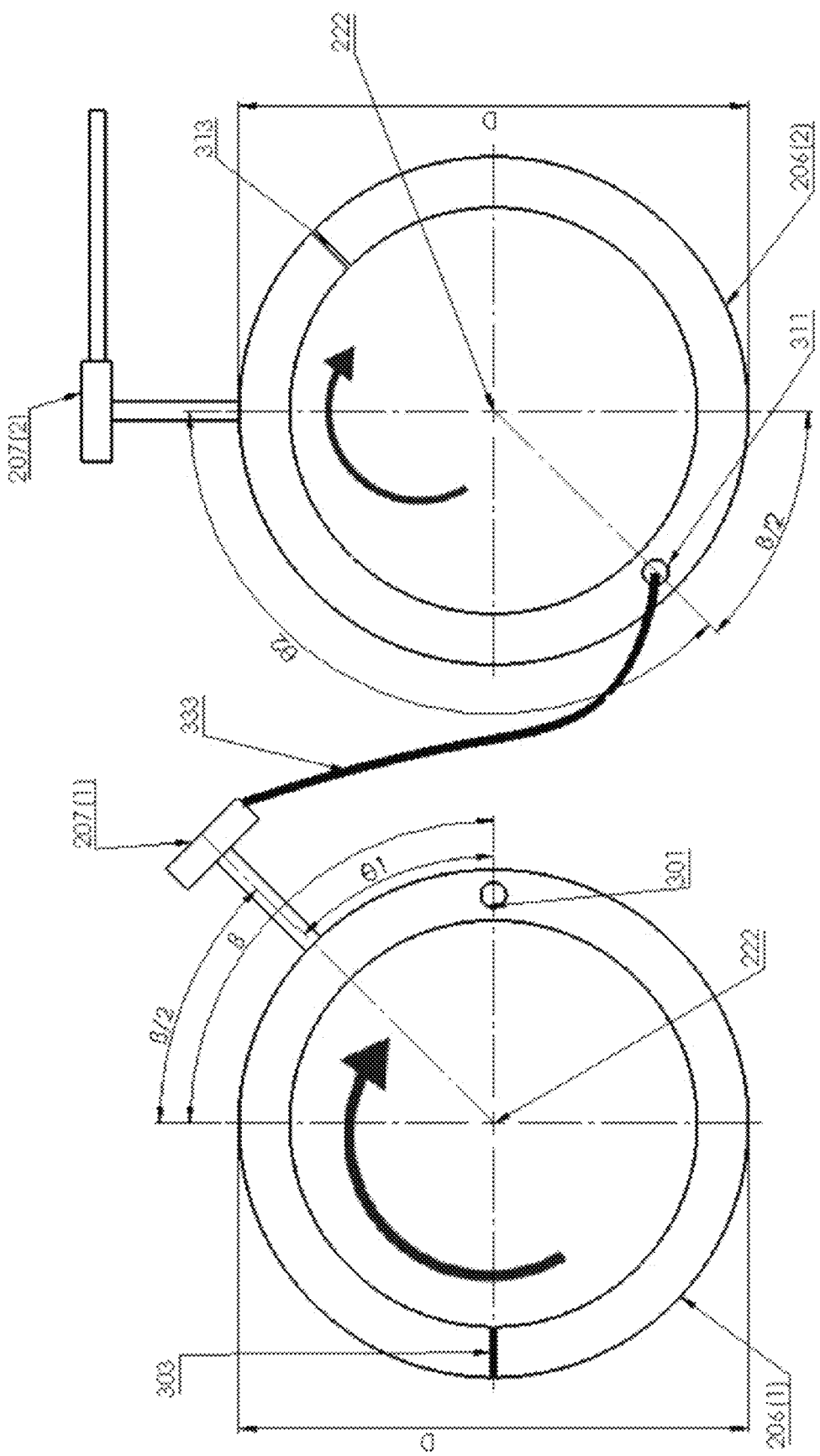
FIG. 10 illustrates a moment when ring 206(1) rotates at angle $\beta$ from home position.

FIG. 10 illustrates any moment when ring 206(1) rotates at angle β from home position. Because brush 207(1) and ring 206(2) rotate at the half speed of ring 206(1), so brush 207(1) and ring 206(2) rotate at angle β/2 from home position. As defined at above paragraph, $$\theta 1=\beta-\beta/2=\beta/2;$$

$$\theta 2=180°-\beta/2;$$

So $\theta 1+\theta 2=\beta/2+180°-\beta/2=180°$, and $AL1+AL2=\pi D/2$.

Here, 0<=β<=360°.

Figure 11:
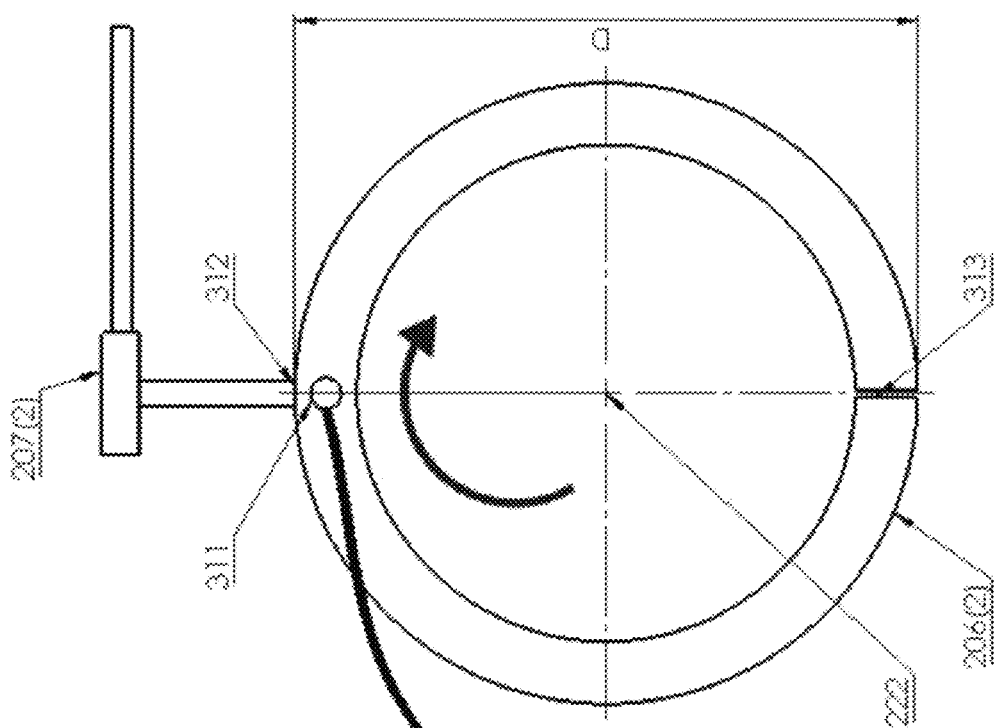
FIG. 11 illustrates the half cycle position when ring 206(1) rotates at angle 360° from home position.
Figure 11:
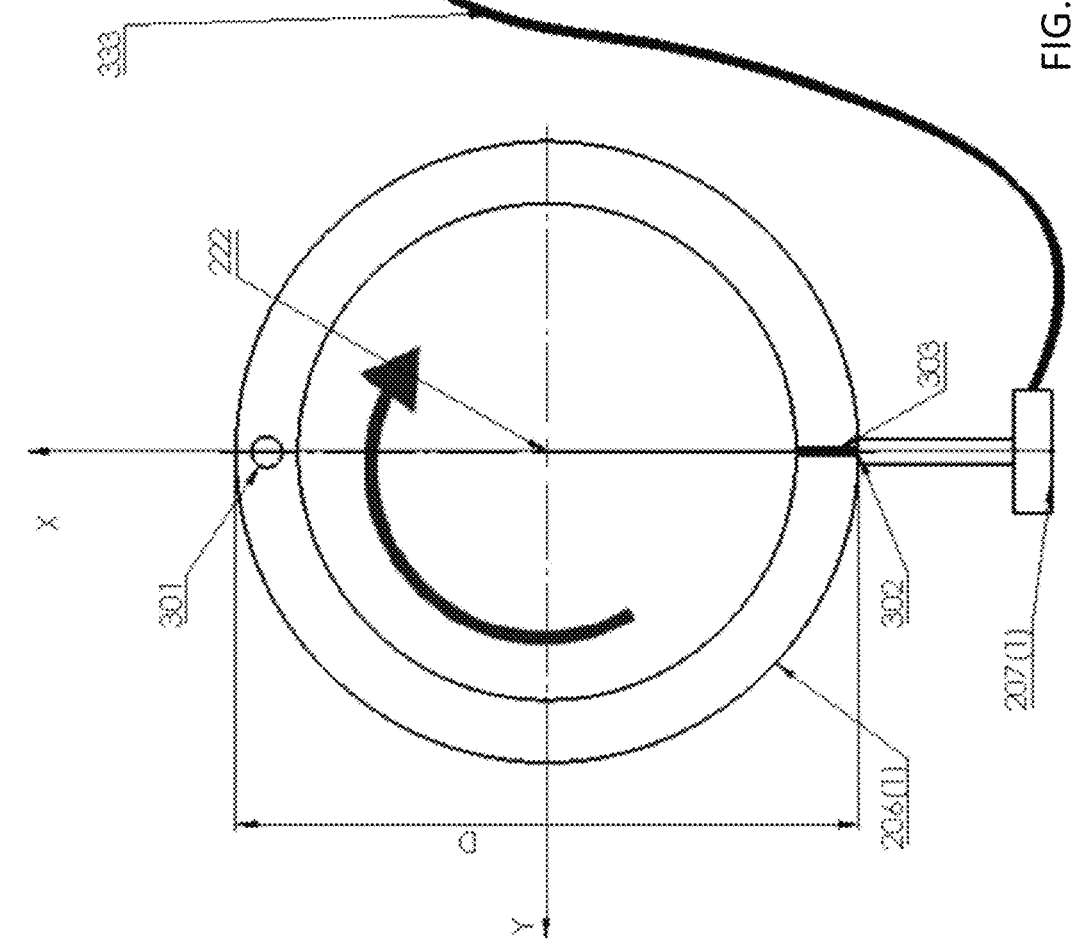

FIG. 11 illustrates the half cycle position when ring 206(1) rotates at angle 360° from home position. At the half cycle position, said rings and brushes in slip ring 01(1) and 01(2) are defined as follows:

$$\theta 1=180°,$$

$$\theta 2=0°.$$

Figure 12:
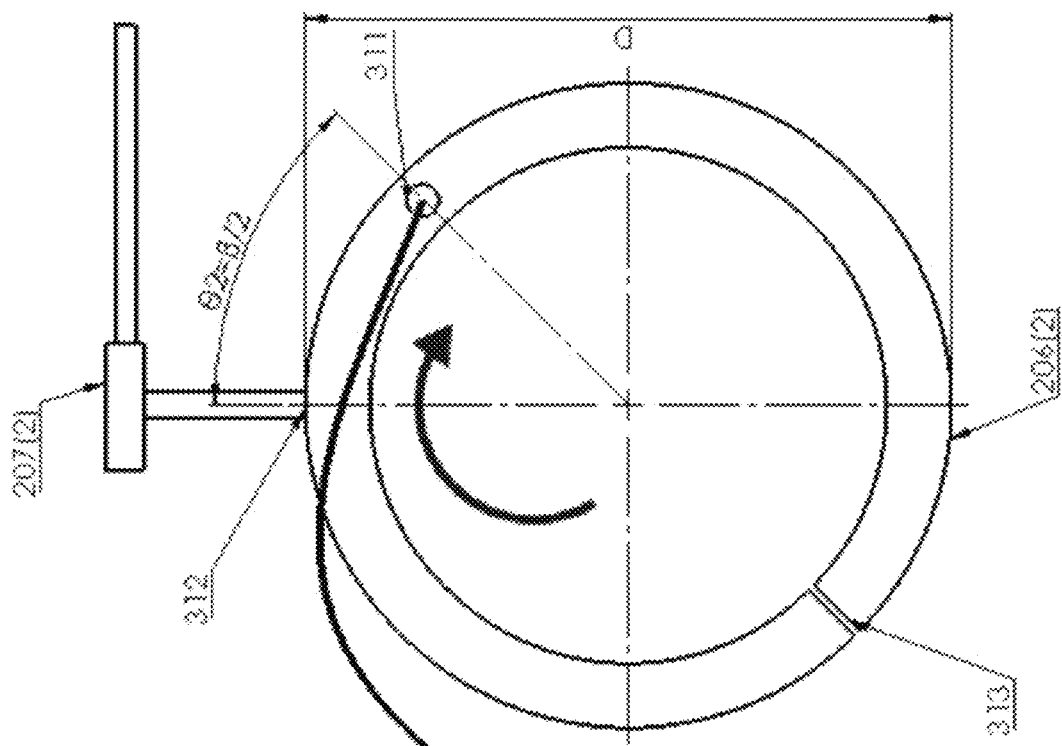
FIG. 12 illustrates a moment when ring 206(1) rotates at angle $\beta$ from said half cycle position.
Figure 12:
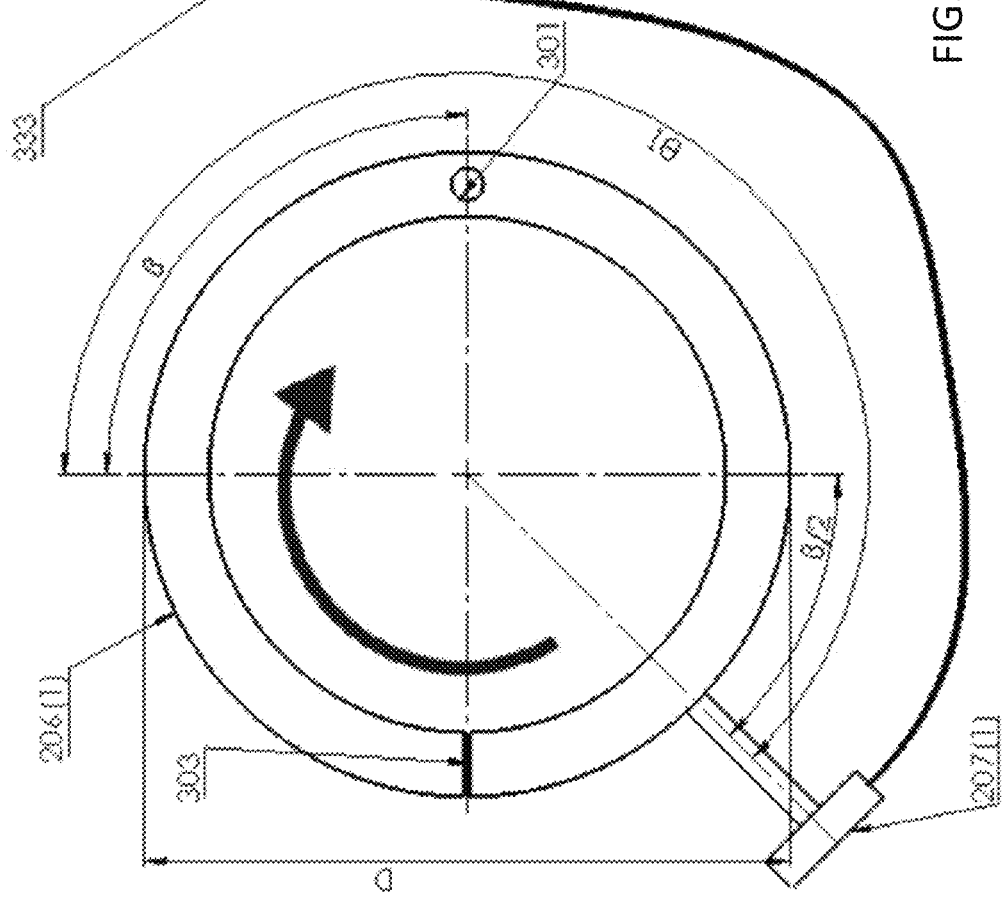

FIG. 12 illustrates any moment when ring 206(1) rotates at angle β from said half cycle position. The slip ring assembly may be engaged with said gear assembly in the first stage slip ring, wherein the gear teeth numbers of said gears are specified to enable the stator in the first stage slip ring and the rotor in second stage slip ring rotate at the half speed of the rotor in first stage slip ring. The stator in second stage slip ring may be fixed with ground. Because brush 207(1) and ring 206(2) rotate at the half speed of ring 206(1), so brush 207(1) and ring 206(2) rotate at angle β/2 fro its half cycle position. Here we have:

$$\theta 1=180°-\beta+\beta/2=180°-\beta/2;$$

$$\theta 2=\beta/2;$$

So $\theta 1+\theta 2=180°-\beta/2+\beta/2=180°$, and $AL1+AL2=\pi D/2$.

Figure 2:
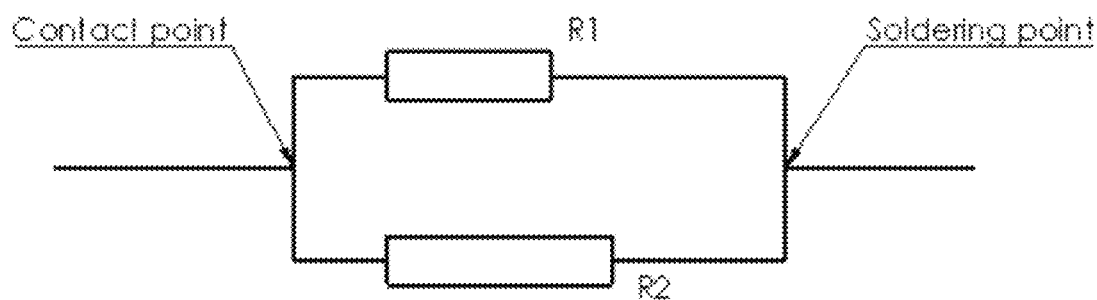
FIG. 2 is the equivalent circuit of FIG. 1.

The analysis from above paragraphs can be summarized as follows: in the current disclosure, under the definition of home position as shown in FIG. 9 and half cycle position in FIG. 11, if the stator on the first stage and the rotor on the second stage will rotate together, at the half speed of the rotor on the first stage, the total distance from the terminating spot of 301 to contact spot 312 is a constant, at any moment, except the home position and half cycle position. At home position as shown in FIG. 9, the distance between terminating spot 301 to contact spot 302 is zero, so the ring 206(1) is bypassed. The signal transmitted from 311 to 312 is a parallel circuit at this moment, and the R1=R2 due to the equal arc length (see FIG. 2). So there is no phase difference in the parallel transmission. At half cycle position as shown in FIG. 11, the distance between terminating spot 311 to contact spot 312 is zero, so the ring 206(2) is bypassed. The signal transmitted from 301 to 302 is a parallel circuit at this moment, and the R1=R2 due to the equal arc length (see FIG. 2). So there is no phase difference in the parallel transmission.

Figure 13:
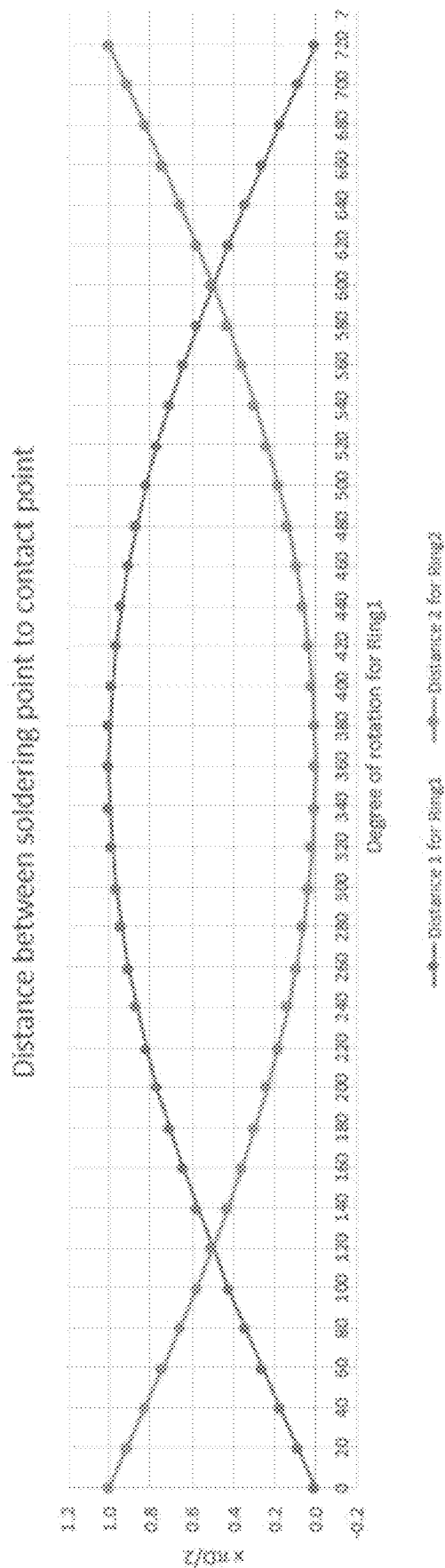
FIG. 13 is a chart to show the arc length changes of terminating spot relative to the contact spot for the two single stage slip rings in FIG. 8.

FIG. 13 is a chart to show the arc distance changes of terminating spot relative to the contact spot for the two stage slip rings in FIG. 9. Ring 1 refers to ring 206(1). Ring 2 refers to ring 206(2). The X-axis is the rotation angle of ring 1. The full cycle is 720°. The sum of distance 1 and distance 2 is always a constant: πD/2.

What is claimed is:

1. A single channel high frequency slip ring assembly with through bore comprising:
   a first stage slip ring with a first stage through bore;
   a second stage slip ring with a second stage through bore;
   a gear assembly;
   an internal cable;
   each of said first stage slip ring and second stage slip ring further comprising:
   a ring having a circumference, wherein the ring is terminated with a cable on a terminating spot on said circumference;
   a brush running in contact with said ring on a contact spot;
   a ring holder for mounting said ring;
   a brush holder for mounting said brush;
   said ring holder is rotatable relative to said brush holder;
   said first stage slip ring and said second stage slip ring are further connected in series sequence, where said brush holder in said first stage slip ring is mechanically connected with said ring holder in said second stage slip ring; said internal cable electrically connects said brush in said first stage slip ring with said ring in said second stage slip ring.

2. A single channel high frequency slip ring assembly with through bore, according to claim 1, wherein said ring has an angled notch on the circumference to break said ring; said terminating spot on said ring and said angled notch are separated 180° apart around the circumference of said ring; said ring in first stage slip ring and said ring in second stage slip ring have the same diameter.

3. A single channel high frequency slip ring assembly with through bore, according to claim 1, wherein said first stage slip ring further includes: a driven gear on said brush holder, a driving gear on said ring holder; wherein said driven gear, said driving gear, said ring holder and said brush holder being coaxially disposed on a common axis and rotatable around said common axis.

4. A single channel high frequency slip ring assembly with through bore, according to claim 1, wherein said gear assembly further includes: an input gear, an output gear, and a gear shaft to support said input gear and said output gear; said input gear, said output gear and said shaft being coaxially disposed on a common axis and rotatable around said common axis.

5. A single channel high frequency slip ring assembly with through bore, according to claim 1, wherein said first stage slip ring and said second stage slip ring are further engaged with said gear assembly; wherein an input gear of said gear assembly is engaged with a driving gear on said ring holder in said first stage slip ring, and an output gear of said gear assembly is engaged with a driven gear on said brush holder in said first stage slip ring; wherein each of the input gear, the driving gear, the output gear, and the driven gear include gear teeth, with each having a gear teeth numbers, wherein the gear teeth numbers of the input gear, the driving gear, the output gear, and the driven gear are specified to enable said brush holder in said first stage slip ring and said ring holder in said second stage slip ring rotate at a half speed of said ring holder in said first stage slip ring; said brush holder in said second stage slip ring is fixed with ground.

6. A single channel high frequency slip ring assembly with through bore, according to claim 1, wherein said slip ring assembly further has a home position; while in the home position a first arc length between said terminating spot and said contact spot on said ring in said first stage slip ring along the circumference of said ring is a minimum value of the first arc length; while in the home position, a second arc length between said terminating spot and said contact spot on said ring in said second stage slip ring is a maximum value of said arc lengths.

7. A multi-channel high frequency slip ring assembly with through bore, comprising:
   a first stage slip ring with a first stage through bore;
   a second stage slip ring with a second stage through bore;
   a gear assembly;
   an internal cable bundle with multiple cables;
   each of said first stage slip ring and second stage slip ring further comprising:
   a ring assembly with multiple rings, wherein in each of the multiple rings includes a circumference, the ring assembly including a cable bundle with multiple cables soldered on a terminating spot on each ring's circumference respectively;
   a brush assembly with multiple brushes running in contact with said ring assembly on a contact spot in each channel respectively;
   a ring holder for mounting said ring assembly;
   a brush holder for mounting said brush assembly;
   said ring holder is rotatable relative to said brush holder;
   said first stage slip ring and said second stage slip ring are further connected in series sequence, where said brush holder in said first stage slip ring is mechanically connected with said ring holder in said second stage slip ring; said internal cable bundle electrically connects said brush assembly in said first stage slip ring with said ring assembly in said second stage slip ring in each channel respectively.

8. A multi-channel high frequency slip ring assembly with through bore, according to claim 7, wherein each of the multiple rings in said ring assembly has an angled notch on its circumference to break each of the multiple rings; wherein each of the multiple rings include a circumference, and on each of the multiple rings said terminating spot and said angled notch are separated 180° apart around the circumference of said ring; wherein each of the multiple rings in the first stage slip ring and each of the multiple rings in said second stage slip ring have the same diameter.

9. A multi-channel high frequency slip ring assembly with through bore, according to claim 7, wherein said first stage slip ring further includes: a driven gear on said brush holder, a driving gear on said ring holder; said driven gear, said driving gear, said ring holder and said brush holder being coaxially disposed on a common axis and rotatable around said common axis.

10. A multi-channel high frequency slip ring assembly with through bore, according to claim 9, wherein said gear assembly further includes: an input gear, an output gear, and a gear shaft to support said input gear and said output gear; the input gear, the output gear and the shaft being coaxially disposed on a common axis and rotatable around said common axis.

11. A multi-channel high frequency slip ring assembly with through bore, according to claim 10, wherein said slip ring assembly is further engaged with said gear assembly; wherein said input gear of said gear assembly is engaged with said driving gear on said ring holder in said first stage slip ring, and said output gear of said gear assembly is engaged with said driven gear on said brush holder in said first stage slip ring; wherein each of the input gear, the driving gear, the output gear, and the driven gear include gear teeth, with each having gear teeth numbers, wherein the gear teeth numbers of the input gear, the driving gear, the output gear, and the driven gear are specified to enable said brush holder in said first stage slip ring and said ring holder in said second stage slip ring rotate at a half speed of said ring holder in said first stage slip ring; said brush holder in said second stage slip ring is fixed with ground.

12. A multi-channel high frequency slip ring assembly with through bore, according to claim 7, wherein said slip ring assembly further has a home position: while in the home position a first arc length between said terminating spot and said contact spot on each of said multiple rings in said first stage slip ring along the circumference of said rings is a minimum value of the first arc length; while in the home position a second arc length between said terminating spot and said contact spot on each of said multiple rings in said second stage slip ring is a maximum value.

* * * * *